United States Patent [19]

Ito et al.

[11] 4,338,241

[45] Jul. 6, 1982

[54] SYNTHETIC RESIN COMPOSITION

[75] Inventors: Hideo Ito; Issei Ueda, both of Onomichi; Yasuo Morinibu, Hiroshima; Michitomo Takeyasu, Fukuyama, all of Japan

[73] Assignee: Onomichi Kumika K.K., Hiroshima, Japan

[21] Appl. No.: 73,141

[22] Filed: Sep. 6, 1979

[30] Foreign Application Priority Data

Jul. 4, 1979 [JP] Japan ................................ 54-085313

[51] Int. Cl.$^3$ ............................................. C08L 75/04
[52] U.S. Cl. .................................... 523/200; 523/210; 524/445; 524/447; 524/448; 524/451
[58] Field of Search ................. 260/38, 37 EP, 37 N; 428/404

[56] References Cited

U.S. PATENT DOCUMENTS

| | | | |
|---|---|---|---|
| 2,046,071 | 6/1936 | Harding et al. | 428/404 |
| 2,699,409 | 1/1955 | Hashimoto | 428/404 |
| 2,986,476 | 5/1961 | Larsen | 428/404 |
| 3,169,075 | 2/1965 | Morrow et al. | 428/404 |
| 3,198,656 | 8/1965 | Harlan | 428/404 |
| 3,198,758 | 8/1965 | Donnelly | 260/38 |
| 3,216,966 | 11/1965 | Collins et al. | 260/38 |
| 3,415,773 | 12/1968 | Collins et al. | 260/38 |
| 3,477,979 | 11/1969 | Hillyer | 260/37 EP |
| 4,190,547 | 2/1980 | Mahnke et al. | 260/38 |

*Primary Examiner*—Lewis T. Jacobs
*Attorney, Agent, or Firm*—Oblon, Fisher, Spivak, McClelland & Maier

[57] ABSTRACT

A synthetic resin composition comprises a resin and a sintering granular clay mineral prepared by coating core particles with fine clay mineral and sintered the coated mineral particles.

15 Claims, No Drawings

SYNTHETIC RESIN COMPOSITION

BACKGROUND OF THE INVENTION

1. Field of the Invention

The present invention relates to a synthetic resin composition which comprises a synthetic resin such as a urethane resin or epoxy resin used for public engineering works, and a specific granular filler.

2. Description of the Prior Art

It has been known to use synthetic resins such as urethane resins and epoxy resins in the field of public engineering works such as packing and bonding for gaps of slabs under tracks. However, these synthetic resins are remarkably expensive.

In order to improve the mechanical properties of these synthetic resins and to decrease the cost of these synthetic resins, it has been proposed to combine a filler with the synthetic resin. Howwever, the art has not succeeded to obtain a synthetic resin composition suitable for said purposes.

The inventors have studied on sintering treatments of various mineral fine powders and uses of the sintered products in various fields especially as fillers for synthetic resins, especially uses of sintered clay minerals.

The inventors have studied to prepare a sintered granular filler by an extrusion granulating method. Fine mineral powders such as clay, talc, kaolin, bentonite and diatomaceous earth are selected and mixed and the mixture of the fine mineral powders is kneaded with 15 to 20 wt.% of water and the resulting pasty mixture is extruded in a thread form through a metallic gauze under a desired pressure and cut for a length of 1 to 1.5 mm. The cut beads are tumbled in a rotary cylinder to form spherical beads and the spherical beads of the mineral are sintered at 800° to 1,200° C. to obtain sintered granular filler. The sintered granular filler can be used as the filler for a synthetic resin used in public engineering works. However, the bulk density of the filler is high and the mechanical properties of the resin composition are not satisfactory and the resin composition is expensive.

SUMMARY OF THE INVENTION

It is an object of the present invention to provide a synthetic resin composition which has excellent mechanical properties and low cost.

It is another object of the present invention to provide a synthetic resin composition which is suitable for public engineering works especially packing and bonding for gaps of slabs under tracks.

The foregoing and other objects of the present invention have been attained by providing a synthetic resin composition which comprises a resin and a sintered granular clay mineral which is prepared by coating core particles with fine clay mineral and sintering the coated clay mineral particles.

DETAILED DESCRIPTION OF THE PREFERRED EMBODIMENTS

The preparation of the sintered granular clay mineral used in the present invention will be further illustrated.

The core particles should be porous and preferably porous particles obtained by blowing a blowable mineral by baking in a kiln and pulverizing the porous mass. The size of the core particles is preferably 0.1 to 10 mm especially 0.3 to 5 mm as average diameter. The blowable minerals are well known, and refer to the minerals which are blown to increase their apparent volumes to form porous minerals such as obsidian, vermiculite and hydrobiotite.

In the coating operation, suitable minerals such as clay, diatomaceous earth, bentonite, kaolin and talc are selected and mixed to prepare a coating powder.

The typical coating powder is a mixture of 20 to 50 wt.% of bentonite and 80 to 50 wt.% of the other minerals such as diatomaceous earth, clay, kaolin and talc.

In the coating operation, the core particles are wetted with water or an aqueous solution of a thickener such as carboxymethyl cellulose, or polyvinyl alcohol, and the coating powder is coated on the core particles. The operation can be repeated to form a coated layer having any desired thickness.

For example, the core particles are moved and water or an aqueous solution is sprayed on the core particles to wet the surface of the core particles, then the coating powder is charged to coat the same on the core particles, then water or an aqueous solution is further sprayed to wet the coated core particles, and the coating powder is charged to coat the same on the coated core particles. This operation is repeated until a coated layer having desired thickness is formed.

The typical coating operation is carried out by using a granulating apparatus such as a tumbler or a fluidized bed coater. The core particles are stirred by a stirrer in a vessel and water or an aqueous solution is sprayed from the top, and the coating powder is charged from the top, and the spray of water and the charge of the coating powder are repeated during stirring. It is preferable to feed air during the coating operation. The amount of water sprayed can be to wet the surface of the core particles or the coated core particles so as to further coat the coating particles. The size of coated particles is preferably 0.2 to 30 mm especially 0.4 to 10 mm as average. The coated particles are sintered in a kiln such as a rotary kiln at a temperature for binding the coated layer such as 700° C. to 1,400° C. preferably 800° C. to 1,200° C. especially 800° C. to 1,000° C. to obtain sintered bulky granular clay mineral. The bulk density of the sintered bulky granular clay mineral is usually 0.3 to 1.0 preferably 0.5 to 0.9.

The sintered bulk granular clay mineral has high oil absorption.

When the core particles are porous particles having low bulk density, the bulk density of the coated particle can be decreased and the bulk density of the sintered bulky granular clay mineral can be decreased. The preparation of the sintered bulky granular particles will be further illustrated by certain examples.

EXAMPLE 1

Vermiculite is pulverized and sieved. The powder is baked in a rotary kiln at 900° to 1,000° C. to form porous particles. The porous particles are used as the core particles. The porous particles have diameters of 0.6 to 1.2 mm and bulk densities of 0.2 to 0.3 g/cm$^3$.

A coating apparatus having a cylindrical body and a rotary table at the bottom is used. The rotary table is rotated by a motor and a compressed air is fed from bottom of the rotary table.

1,000 g of the porous particles as the core particles are charged on the rotary table, rotated at 300 to 450 r.p.m. while feeding air through the gap between the wall of the cylinder and the rotary table, and 600 ml of water is fed through a nozzle to the porous particles for about 10 to 15 seconds.

A coating powder comprising 20 to 50 wt.% of bentonite and 80 to 50 wt.% of diatomaceous earth, clay, kaolin or talc is prepared by pulverizing and mixing the minerals.

3,000 g of the coating powder is divided into several portions. Each portion is sequentially charged. Water is sprayed before charging each portion. The coated particles are fluidized and collided by the compressed air fed through a gap between the rotary table and the wall of the cylindrical body. The hardness of the coated layer is increased by the collisions with the compressed air. After charging the coating powder, the tumbling operation is further continued for about 3 to 5 minutes. The coated particles are discharged from the coating apparatus.

The coated particles of granular clay mineral are kept in a ceramic vessel and sintered at 800° to 1,000° C. in a burner kiln. After the sintering operation, the sintered granular clay mineral is cooled and discharged.

The characteristics of the typical sintered granular clay mineral are as follows.

| Particle diameter: | 0.71–1.68 mm |
| Bulk density: | 0.62 |
| True specific gravity: | 1.18 |
| Oil absorption: linseed oil: | 14 ml/100 g. |

Other examples are further illustrative.

EXAMPLE 2

A fine coating powder is prepared by mixing 50 wt.% of bentonite with 50 wt.% of diatomaceous earth. Core particles are prepared by baking pulverized vermiculite at 900° C.

A cylindrical coating apparatus has a rotary disk rotated at 300 to 450 r.p.m. and a compressed air is fed through the gap between the cylindrical wall and the rotary disk.

1,000 g of the core particles having diameters of 0.8–1.0 mm are charged on the rotary disk rotated at 300 to 450 r.pm. and 200 g. of water is sprayed through a nozzle to the core particles and 1,500 g. of the fine coating powder is charged by alternately charging water and the fine coating powder. The coating operation can be accomplished for about 30 to 40 minutes to obtain 2,500 g of spherical coated particles having diameters of 1.0 to 1.4 mm. The coated particles are sintered at 800° to 1,200° C. in an electric furnace to obtain the sintered granular clay mineral having bulk densities of 0.4 to 0.5.

The sintered granular clay mineral has remarkably low bulk density because of the core particles, but it has high strength because of the coated layer and it has high affinity to the synthetic resins so as to uniformly disperse in the synthetic resin and to firmly bind to the synthetic resin.

The synthetic resin composition of the present invention is prepared by blending the sintered granular clay mineral to a synthetic resin whereby excellent compressive strength and suitable resilience can be imparted. These characteristics are required in public engineering works especially construction of rail tracks.

The preparation of urethane resin composition used for construction will now be illustrated.

EXAMPLE 3

Urethane prepolymer (A) is prepared by reacting diisocyanate with polyester of glycol and dicarboxylic acid.

100 ml of the urethane prepolymer (A) is mixed with 100 ml of a hardener of amine solution and 100 ml of the sintered granular clay mineral (diameters of 1.0 to 1.4 mm) is uniformly mixed and the mixture is coated in a mold of 100 mm×100 mm×25 mm. The hardening is completed for 12 hours. After 24 hours, the test piece is cut. The sintered granular clay mineral is uniformly distributed and is firmly bonded to the urethane resin.

The fatigue factor of the test piece is measured by the fatigue testing machine. The results are as follows.

| | |
|---|---|
| Urethane resin no filler | 10 t/cm$^2$ |
| Composition of urethane resin and 20 vol. % of sintered granular clay mineral | 21 " |
| Composition of urethane resin and 30 vol. % of sintered granular clay mineral | 27 " |

EXAMPLE 4

Epoxy resin composition and phenol resin composition are respectively prepared by admixing 20 vol.% or 30 vol.% of the sintered granular clay mineral and the fatigue factors thereof are measured. The fatigues factors are also remarkably higher than that of no sintered granular clay mineral.

We claim:

1. A synthetic resin composition which comprises a urethane resin and a filler, wherein each particle in said filler is prepared by layering an outer coat of a fine clay mineral on an inner core of a blowable mineral, and sintering the resulting particle.

2. The synthetic resin composition of claim 1 wherein said resin is a liquid when it is blended with said filler.

3. The synthetic resin composition of claim 1 wherein said resin is a urethane resin prepared by reacting a urethane prepolymer with a hardener.

4. The synthetic resin composition of claim 1 wherein said fine clay mineral used for coating said inner core comprises 20 to 50% by weight of bentonite.

5. The synthetic resin composition of claim 1 wherein said filler particles have a particle diameter of 0.2 to 30 mm.

6. The synthetic resin composition of claim 1 wherein the size of said inner core is 0.1–10 mm.

7. The synthetic resin composition of claim 1 wherein said blowable mineral is selected from the group consisting of obsidian, vermiculite and hydrobiotite.

8. The synthetic resin composition of claim 1 wherein said fine clay mineral is selected from the group consisting of clay, diatomaceous earth, bentonite, kaolin, talc and mixtures thereof.

9. The synthetic resin composition of claim 1 wherein said fine clay mineral is a mixture of 20–50% bentonite and 80–50% of a mineral selected from the group consisting of a diatomaceous earth, clay, kaolin and talc.

10. The synthetic resin composition of claim 1 wherein the inner core of said filler is wetted with water or an aqueous solution of a thickener prior to layering said outer coat of fine clay mineral thereon.

11. The synthetic resin composition of claim 1 wherein the sintering of the resulting filler particles is carried out at 700°–1,400° C.

12. The synthetic resin composition of claim 11 wherein said sintering is carried out at 800°–1,200° C.

13. The synthetic resin composition of claim 12 wherein the sintering is carried out at 800°–1,000° C.

14. The synthetic resin composition of claim 1 wherein the bulk density of said filler is 0.5–0.9.

15. The synthetic resin composition of claim 1 wherein said blowable mineral is obsidian.

* * * * *